May 4, 1965    C. D. MacCRACKEN ET AL    3,181,793
INTEGRAL HOT AIR SPACE HEATING AND WATER HEATING SYSTEM
Filed Oct. 23, 1961    7 Sheets-Sheet 3
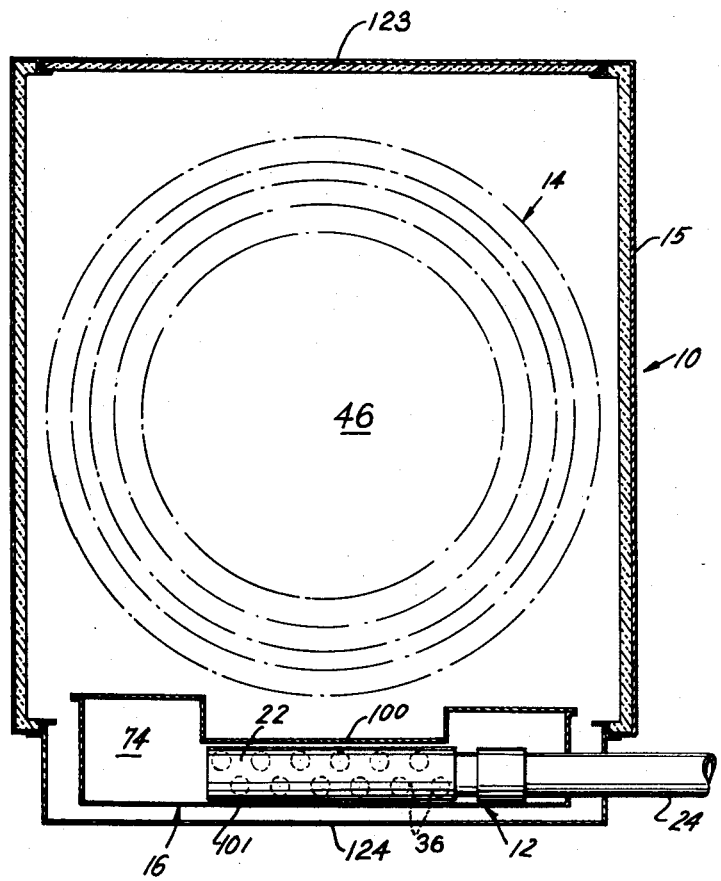
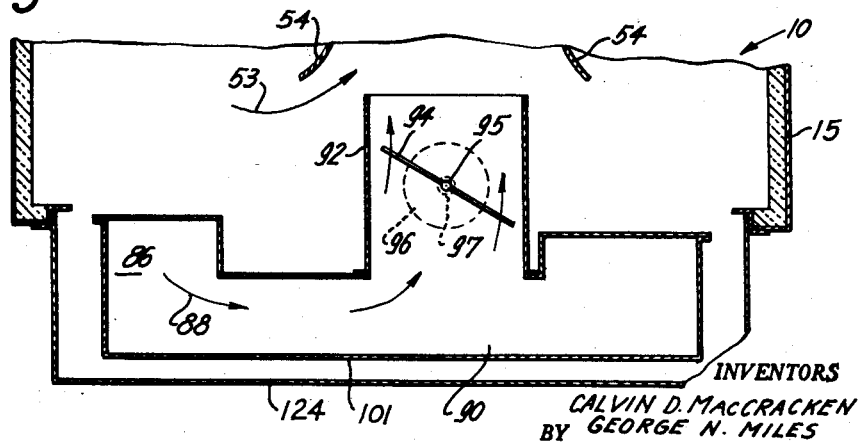
INVENTORS
CALVIN D. MacCRACKEN
BY GEORGE N. MILES
Curtis, Morris & Safford
ATTORNEYS May 4, 1965 C. D. MacCRACKEN ET AL 3,181,793
INTEGRAL HOT AIR SPACE HEATING AND WATER HEATING SYSTEM
Filed Oct. 23, 1961 7 Sheets-Sheet 7

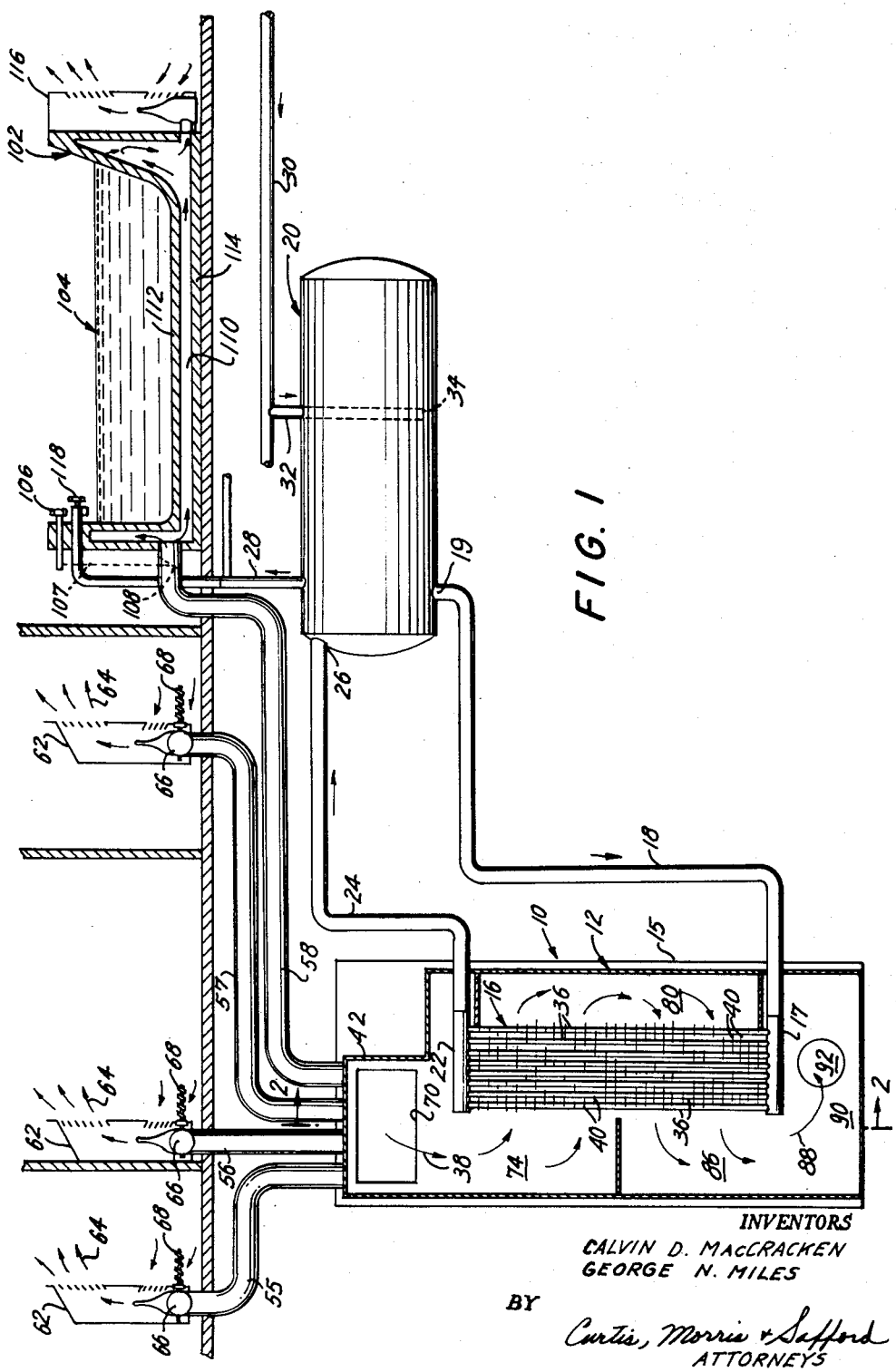

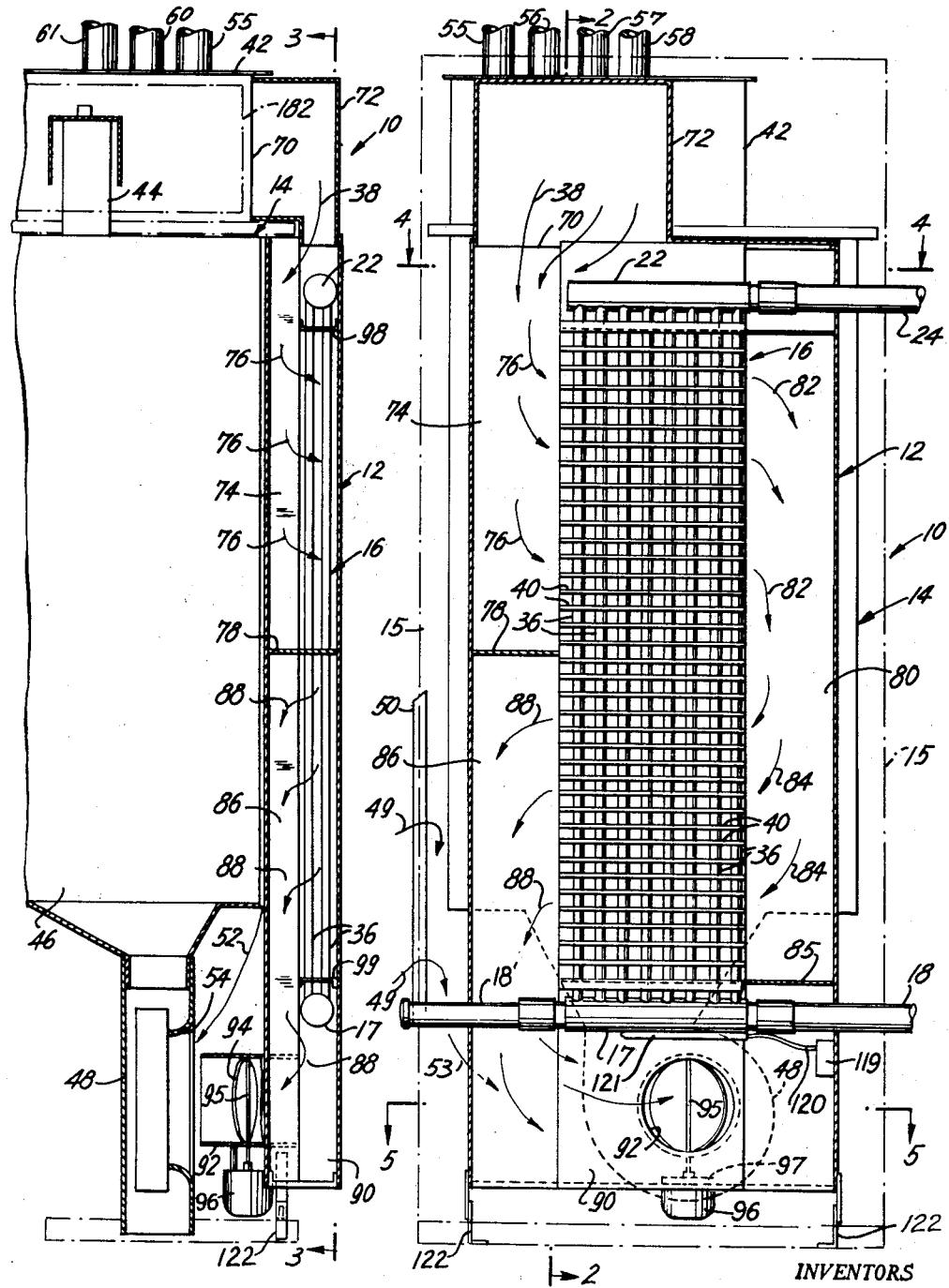

INVENTORS
CALVIN D. MacCRACKEN
GEORGE N. MILES
BY
Curtis, Morris & Safford
ATTORNEYS

United States Patent Office 3,181,793
Patented May 4, 1965

3,181,793
INTEGRAL HOT AIR SPACE HEATING AND WATER HEATING SYSTEM
Calvin D. MacCracken and George N. Miles, Tenafly, N.J., assignors to Jet-Heet, Incorporated, Englewood, N.J.
Filed Oct. 23, 1961, Ser. No. 146,829
18 Claims. (Cl. 237—2)

This invention relates to an integral hot air space heating and hot water heating system. This integral system is economical in installation and in operation and supplies both hot air for space heating and domestic hot water from a common source of heat.

In the modern home, it is considered essential to have both automatic space heating equipment for heating the rooms and hot water heating equipment insuring a supply of hot water for bathing, laundry, dish washing and similar domestic uses. Furthermore, it is considered important that the space heating equipment and hot water equipment make no demands on the homeowner in the way of recurrent adjustments or other need for attention. Moreover, to make this equipment widely available to homeowners throughout the country, its cost must be kept as low as possible.

One of the ways in which equipcent costs can be minimized is by using a common heat source for both space heating and dometic hot water heating. This combination is, of course, fairly common in the relatively costly "wet heat" type of system. This is made possible by the fact that the heated liquid which is circulated to the space heating radiators or heating convectors is raised to a temperature level high enough and can transfer its heat conveniently enough to serve also for heating domestic hot water.

With the usual warm air circulation type of space heating system, it is quite difficult to achieve a combination with the domestic hot water equipment. In the usual case, the warm air is distributed to the various rooms at a temperature of, say 120° F., which is considerably below the level of 140° F.–160° F. at which the domestic hot water supply should be maintained. Even if the circulation air temperature were raised to 180° F., so much heat exchange surface would be required because of the lower heat exchange coefficient with air that the equipment would be impractically bulky and expensive. If this limitation is circumvented by exposing a water heating coil directly to the furnace burner, new problems arise on the one hand in preventing overheating of the water while insuring adequate space heat, and on the other hand in maintaining the hot water supply when no space heat is needed.

It is a general object of the present invention to provide an integral forced warm air space heating and domestic hot water heating system, wherein the economies of forced warm air space heat and of a single heat source are realized while effectively and conveniently supplying both the space heating and the domestic hot water services.

Among the many advantages of the integral hot air space heating and water heating system described herein as an illustrative example of the present invention are those resulting from the fact that the demands of the space heating service and the demands of the hot water service are met automatically and are adjusted automatically to changes in weather and changing seasons without attention by the homeowner. In the illustrative system shown herein, the individual rooms in the home are maintained automatically at temperature levels that are adapted to the different amounts and types of usage customary for the various rooms. Moreover, an ample supply of hot water is furnished to meet the multiple needs of bathing, automatic laundry and dishwashing apparatus and the like which may be used at any time.

A further advantage of the hot air space heating and hot water heating system described herein as an illustrative embodiment of the present invention is the provision of an integral, compact, economical and efficient hot air furnace and hot water heater utilizing a common heat source.

Another advantage of the integral system described herein as illustrative of the present invention is the provision for heating a bath tub by means of hot air and for maintaining the warmth of the bath water during usage as may be desired by the user.

An advantage of the system described herein is that the domestic water is heated by high velocity forced draft of hot air through a heat exchanger. Any heat not absorbed by the heat exchanger is conserved because the hot air after passing through the heat exchanger is recirculated directly back through the furnace. A high recovery rate is provided.

In accordance with an illustrative embodiment of the invention, the foregoing and other related objects and advantages are achieved in a system in which air at relatively high temperature and pressure is circulated both to individual rooms to be heated and to a domestic hot water heater integral with the furnace. Advantageously, both the space heat requirements and the normal demands for hot water are met in a balanced manner automatically and without complicated or costly controls. A plurality of outlets for space heating air are individually controlled thermostatically to insure that the desired temperature will be maintained in each room to be heated. A water heating air flow circuit is integrally incorporated in the furnace unit and leads from the source of hot air to the hot water heater. This water heating air flow circuit includes its own air flow control damper for regulating air flow through the water heater. In this embodiment of the invention, the water heating air flow circuit is arranged so that less than the full potential air delivery of the hot air blower can flow through this part of the system, and the components of the system are arranged so that air flow is always provided through the water heater whenever it is needed. Thus, an adequate supply of hot water is assured at all times, and there is also an assurance of supplying hot air for space heating purposes at all times whenever required, even during periods when the water is being heated. Furthermore, the furnace unit is arranged to respond to a hot air demand either from the rooms to be heated or from the water heater, and the individual thermostatic control of each room outlet insures against over-heating any room if the furnace unit functions to heat water when no space heat is needed. The hot air is also used to advantage to heat a bath tub and to maintain warmth in the bath water as may be desired by the user.

In another embodiment of the invention, a motor-operated damper valve is utilized and has two alternative positions. In one position this valve shuts off the flow of hot air to the room registers and diverts all of the hot air into the hot water heating air flow circuit in response to demands for hot water. In its alternative position this valve shuts off the hot air flow to the hot water heater and opens up the hot air flow to the room registers.

A more complete understanding of the invention can be had by reference to the following description of illustrative embodiments of the invention, when read in conjunction with the accompanying drawings, in which:

FIGURE 1 is an elevational view of an illustrative example of an embodiment of the integral hot air space heating and domestic water heating system of the present invention, with portions of the system being shown schematically and in section;

FIGURE 2 is an end elevational sectional view on enlarged scale of the integral hot air furnace and hot water heater unit of the system of FIGURE 1. FIGURE 2 is a section taken generally along the line 2—2 in FIGURES 1 and 3, showing the hot water heater integrally incorporated in the furnace unit and showing the air flow circuit in the furnace for heating the water.

FIGURE 3 is a rear elevational sectional view of the integral furnace unit of FIGURE 2, being taken along the line 3—3 of FIGURE 2;

FIGURE 4 is a plan sectional view of the integral furnace unit being taken along the line 4—4 of FIGURE 3 and being shown on further enlarged scale;

FIGURE 5 is a partial plan sectional view taken along the line 5—5 of FIGURE 3 and shown on a further enlarged scale. FIGURE 5 shows the automatic damper control for the water heating air flow circuit;

FIGURES 8 and 8A illustrate a modified system including an automatic thermostatically actuated damper for the water heating air flow circuit;

FIGURE 10 is a partial sectional view taken along the line 10—10 of FIGURE 9 and looking upwardly.

Figure 6:
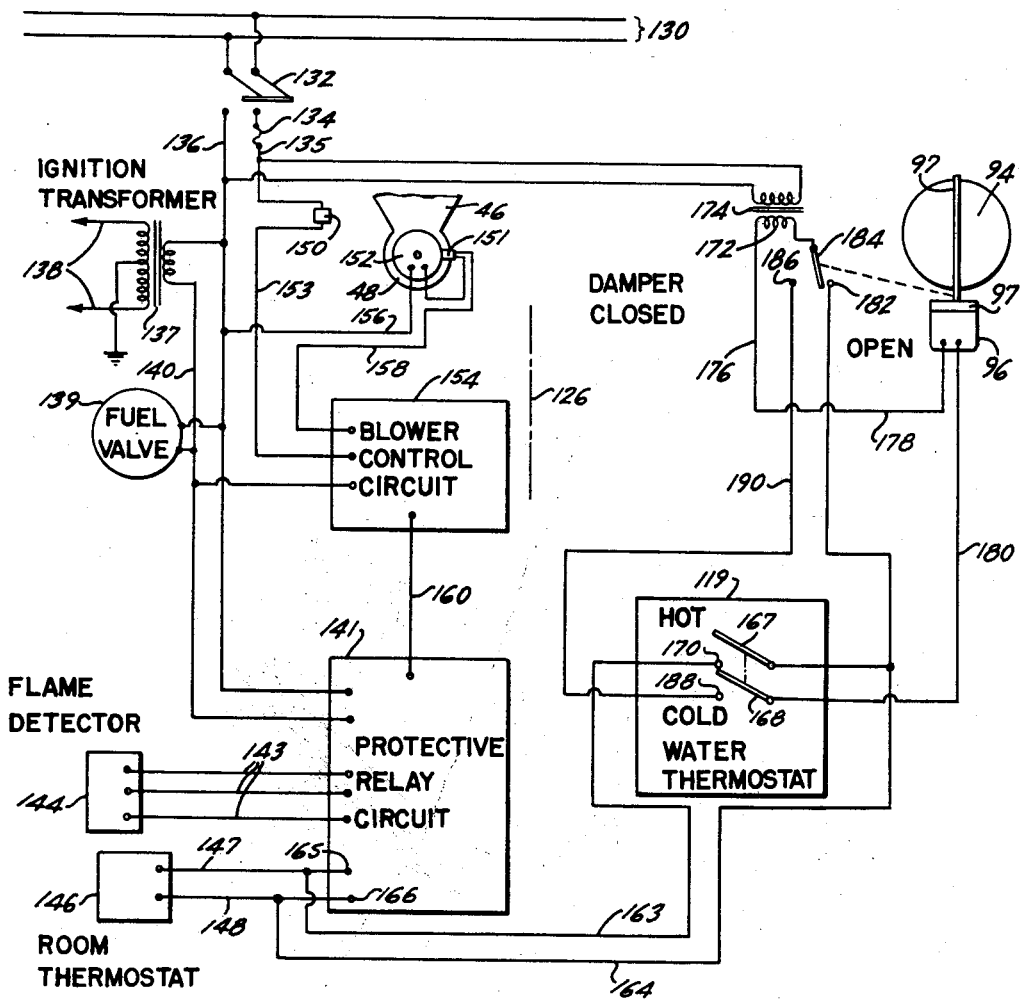
FIGURE 6 is a schematic circuit diagram showing the automatic space heating and water heating controls for the system.

In the illustrative example of a preferred embodiment of the integral hot air space heating and hot water heating system of the present invention as shown in FIGURES 1–5, there is provided a hot air furnace unit, generally indicated at 10, including a hot water heater 12 and a high temperature, high pressure forced air flow hot air heater 14 (FIGURES 2, 3, and 4). Both the water and air heaters are integrally incorporated in the furnace unit 10 and are operated from a common source of heat. In this example, the hot air heater 14 is shown as generally cylindrical in configuration about a vertical axis, and it occupies the major portion of the space within the housing 15 of the furnace unit 10. The hot water heater 12 is shown as having a generally U-shaped configuration as seen best in FIGURE 4, and it nests compactly about one side of the hot air heater. Advantageously, the hot water heater 12 is supported on two legs and is connected to the bonnet or plenum chamber of the furnace unit. Thus, the hot water heater is readily assembled with the furnace at the factory or is conveniently incorporated therewith later in the home.

The hot water heater 12 includes a heat exchanger 16 having cold water header or manifold 17 at the bottom which is connected through a pipe line 18 to an outlet circulation connection 19 at or near the bottom of an insulated hot water storage tank 20. At the top of this heat exchanger 16 is a hot water header or manifold 22 which is connected through a pipe line 24 to another circulation connection 26 on the hot water storage tank at a point higher than the connection point 19.

As hot water is withdrawn from the top of the storage tank 20 through a hot water line 28 for domestic service, for example, for bathing, laundry, dishwashing, and the like, fresh water is fed into the bottom of the storage tank from a fresh water supply line 30 having a feed line 32 extending into the tank to a discharge point 34 near the bottom of the tank.

During operation when the water in the tank 20 begins to cool off or whenever hot water has been used, circulation of the water by gravitation through the heater 12 quickly serves to replenish the supply of hot water in the tank 20. In order to assure that this circulation by gravitation occurs, the outlet circulation connection 19 is positioned at an elevation substantially higher than the cold water header 17 so that the pipe line 18 has a substantial drop in elevation. Thus, the cooler denser water in the line 18 flows downwardly as indicated by the arrow into the heater 12 and displaces the hotter water therefrom, which flows out and up through the line 24 back into the storage tank 20.

The heat exchanger 16 includes a plurality of heat exchange tubes 36 extending vertically in parallel flow arrangement between the headers 17 and 22 and formed of high heat conductivity and corrosion resistance, for example, these are shown as being metal tubes formed of copper, brass, aluminum, or the like. A preferred construction is to make these tubes of copper. The gravity circulation discussed above forces the cooler water to flow from the header 17 upwardly in parallel circulation through all of the tubes 36. While the water rises through the tubes 36, it is rapidly and advantageously heated by high velocity, high temperature air 38 which is blown through the heat exchanger in a direction generally transversely to the length of the tubes. A large number of closely spaced, parallel heat transfer fins 40 extend horizontally among the tubes 36 and engage these tubes firmly in good heat conductive relationship therewith. These fins 40 are formed of a material of high heat conductivity and in firm engagement with the material used to form the tubes 36 so as to provide good heat transfer. In this preferred embodiment, the fins 40 are formed of aluminum. The hot air 38 from the air heater 14 is blown horizontally between these fins 40 and passes around and among the tubes 36. As seen most clearly in FIGURE 4, these tubes 36 are arranged in staggered relationship in a plurality of rows, thereby providing a large water flow capacity in a compact volume while accommodating a large flow of hot air transversely through the heat exchanger.

The furnace unit 10 includes the high temperature, high pressure forced air flow air heater or furnace 14, discussed briefly above, and an example of a high temperature air heater which is found to work to advantage in this illustrative embodiment of the invention is the air heating furnace described and claimed in United States Patent No. 2,752,912. This high temperature, high pressure air heater 14 is adapted to supply heated air at a temperature in the range from 250° F. to 375° F., and in this system the hot air is supplied at a preferred temperature of the order of 325° F. to 350° F. This heated air is provided from an output plenum chamber or bonnet 42 at the top of the hot air heater 14 and has a pressure of at least 1.00 inch of water when operating only for space heating service. In this system a bonnet pressure of at least 1.00 inch of water is found to be the lowest value for satisfactory space-heating operation in a well-insulated three-bedroom home. A bonnet pressure of the order of 1.25 inches of water is the preferred value which is customarily set at the factory when the furnace is operating only for space heating service. A higher pressure for the hot air 38 in the bonnet 42 may be utilized, if desired, but the preferred value of 1.25 inches is found to work very well in many different types of homes. This bonnet pressure of 1.25 inches of water drops to 0.9 when the furnace is simultaneously providing both space heating and water heating services, and it rises to 1.8 when providing only water heating service.

The air heater 14 comprises a high velocity fuel burner 44 (FIGURE 2) for supplying hot gaseous combustion products to a hot air heat exchanger 46. Air from a blower 48 is heated in the heat exchanger 46 and is discharged into the plenum chamber 42. This same blower also supplies air for combustion to the burner 44, and the cooled exhaust gases from the burner are discharged from the heat exchanger 46 through a suitable vent duct as explained in the above patent.

It is to be noted that the combustion products are at all times kept separated from the fresh air being heated in the heat exchanger 46. The fresh air 49 to be heated or used for combustion is drawn into the side of the furnace housing 15 through an inlet louvre and air filter 50 (FIGURE 3). This inlet air then flows down around the outside of the air heater 14, as indicated in FIGURES 2 and 3 by the arrows 52 and 53, and enters the bell-mouthed intake 54 of the blower 48.

From the plenum chamber 42 the high temperature air is fed at high velocity through a plurality of flexible insulated ducts 55, 56, 57 and 58 to the various rooms to be heated. These insulated air ducts are of small size, preferably having an internal diameter of the order of 2.0 inches with a layer of insulation at least 0.6 of an inch thick surrounding each duct. An example of a flexible insulated air duct which is found to work advantageously in this system is described and claimed in U.S. Patent No. 2,936,792.

For convenience of illustration, only four ducts are drawn in FIGURE 1; however, it is to be understood that this is a schematic illustration and that in typical home installations a larger number of ducts are usually used. The furnace unit 10 is adapted to supply as many as twelve separate air ducts, as is indicated in FIGURE 2, which illustrates a second and a third row of the ducts at 60 and 61 being supplied with high pressure, high temperature air from the bonnet 42.

At their terminal points the respective insulated air ducts 55, 56 and 57 discharge the high temperature air into aspirating diffusers or registers 62. In these diffusers, which may be of the general type described and claimed in United States Patent No. 2,613,587, the high temperature air from the insulated ducts is ejected from nozzles and induces a flow of cooler air from the room and mixes with this cooler room air as is indicated by the flow arrows. Thus, a flow of moderately heated air 64 is discharged from the respective diffusers 62 into the various rooms.

In this high temperature, high velocity system utilizing discharge of air from each of the registers 62 preferably is individually regulated automatically by dampers 66 controlled by individual thermostat elements 68 which sense the temperature of the air in the room. Consequently, the air discharged to each room will be regulated in accordance with the response of the individual thermostat elements 68 to the air temperature in the room. When the temperature of the room air as sensed by the thermostat 68 is above the preset desired level, then the damper 66 is fully closed by the thermostat so that the air flow through its supply duct is entirely shut off.

It this high temperature, high velocity system utilizing small diameter flexible insulated air ducts as described, only a relatively small quantity of the high temperature air is required to be circulated to each of the rooms. As a consequence, no air return ducts are needed from the rooms to be heated because the natural air leakage beneath doors and the like is sufficient to provide for recirculation of the air back into the furnace unit 10 through the inlet air opening 50 in the housing or jacket 15.

In this preferred embodiment of the invention, a water heating air flow circuit is integrally incorporated in the furnace unit 10 and leads from the plenum chamber 42 through the water heater 12 and back to the blower inlet 54. For this purpose, water heater unit 12 includes an intake chamber 72 which is adapted to be connected with an outlet opening 70 in the bonnet 42. This intake chamber 72 forms an extension of the bonnet and feeds the hot air 38 directly down around the header 22 and down into the upper end of a first vertically extending air passage 74 serving as the hot air inlet manifold for the hot water heat exchanger 16. This first manifold passage 74 has a large cross sectional area which is seen best in FIGURE 4 so as to accommodate a large downward flow of the hot air indicated in FIGURE 3 by the arrows 76. The first manifold passage 74 extends down along one half of the total vertical length of the hot water heat exchanger 16 and is closed off at its lower end by a barrier partition 78.

From this first manifold passage, the hot air 76 passes at high velocity transversely around the tubes 36, passing between the heat transfer fins 40 and surging around and among the tubes 36. Then, after this first transverse flow, the hot air enters a second vertically extending air passage 80, as indicated by the arrows 82. This second passage 80 serves as the outlet manifold for the lateral air flow through the upper half of the heat exchanger 16 and also serves as the inlet manifold for a second lateral flow back through the lower half of this heat exchanger, as indicated by the arrows 84. The lower end of the second air passage 80 is blocked by a partition 85 just above the cold water header 17.

A third vertical air passage 86, directly below and in line with the first passage 74, receives the transverse air flow 88 from the lower half of the heat exchanger 16. This third passage 86 opens downwardly into a transverse bottom air passage 90 extending below the heat exchanger 16 and feeding into an outlet duct 92.

In order to complete this water heating air flow circuit back to the blower as shown in FIGURE 2, the outlet duct 92 is directly aligned with and terminates closely adjacent to the bell mouth of the blower intake 54. Thus, it will be appreciated that this water heating air flow circuit is effective in delivering a large volume of hot air through the water heater and in returning this air to the intake of the blower 48.

For purposes of controlling the hot air flow through the water heater 12, a damper 94 is positioned within the duct 92, and its pivot rod 95 is operated by an electric motor 96 which is connected to the rod 95 by a suitable speed reducing gear drive mechanism 97. This motor is adapted to be stopped with the damper 94 in either the open or closed position. The electrical circuit for controlling this motor 96 is described in detail further below.

By virtue of the fact that the hot air flow to the rooms for space heating is in parallel with the air flow through the integral water heater, this illustrative system is arranged so that there is always a supply of hot air either for space heat or for heating hot water, even though both services may be making demands on the system at the same time. In other words, the system is shown as being arranged so that neither service is able to take all of the hot air available to the exclusion of the other. Alternatively, the system can be arranged so that all of the hot air can be utilized briefly for either service to the exclusion of the other.

It will also be seen that the foregoing balance of air distribution, together with automatic control of space heat air delivery, enables the system to operate effectively all year around without any manual changes in the system as the seasons change. During summer months, for example, all of the registers 62 are shut off automatically by the dampers 66 because of the relatively high ambient temperature present in these rooms, preventing any furnace heat from flowing to these rooms, yet enabling the water heater to function in normal fashion.

To provide the necessary capacity for space heating and water heating in a wide variety of different home installations, it is found preferable to utilize an air heater 14 having a heat output rate of at least 60,000 B.t.u. per hour.

It will be noted that the water heater 12 is shown as having a wide U-shape as seen in plan section in FIGURES 4 and 5, and thus, it nests advantageously about one side of the cylindrical hot air heater 14 without appreciably increasing the over-all size of the furnace unit 10. In order to provide a water heating capacity substantially in excess of that normally required for domestic purposes while accommodating the necessary gravitational circulation of the water and the air flow and while providing a compact water heater of suitable configuration for incorporation within the furnace unit, at least eleven of the heat exchanger tubes 36 are used with a length of at least 30 inches and no more than 60 inches for each tube. In this preferred embodiment there are fifteen of the tubes 36, each with an exposed length of 36 inches as seen in FIGURE 2 between the upper and lower end plates 98 and 99. In order to accommodate the necessary hot air flow and water circulation in the successful operation of the integrated system, the inside diameter of the tubes 36 is above ¼ of an inch. Below this size, the heat transfer surface within the tubes is below that found practicable for heating up the water after usage. That is, the recovery rate of the water heater is too slow for practical operation in many modern homes. Above an outside diameter of one inch for the tubes 36, the heat exchanger 16 becomes too bulky for practical incorporation in a furnace unit as shown. The wall thickness of the tubes is made thin, but not so thin as to subject the tubes to weakness. An optimum size is an O.D. of ½ of an inch and an I.D. of 7/16 of an inch.

The headers 17 and 22 are shown as having a two inch diameter and are made of copper. It will be noted that there is a short pipe 18' extending from the opposite end of the header 17. This pipe 18' provides an alternative connection as may be convenient in certain installations and is capped over when not in use.

To provide the required flow of hot air 76, 82, 84 and 88 through the heat exchanger, it is found desirable to have a clearance as seen in FIGURE 4 between the inner wall 100 to the outer wall 101 of at least 1.5 inches, and in this preferred embodiment this clearance is 2.0 inches. The operating length of each half of the heat exchanger between the center barrier 78 and the respective end plates 98 or 99 is 18 inches, and with a clearance between the walls 100 and 101 (FIGURE 4) of 2 inches, this provides 36 square inches for air flow minus the space occupied by the tubes 36 and fins 40. Each of the heat transfer fins 40 has a length of 10 inches and a width of 2.0 inches so as to fit snugly between the walls 100 and 101. The air manifold passages 74, 80 and 86 are each shown as having a cross sectional area of 20 square inches to provide the desired high volume of air flow. These large air manifold passages are located in the corners of the furnace housing 15, thus most efficiently utilizing the space between the cylindrical air heater 14 and the rectangular housing 15.

As illustrated in FIGURE 1, this integrated system also may be used to advantage to pre-heat a bath tub 102 and to maintain the temperature of the bath water 104 during use without requiring the addition of further hot water. In order to pre-heat the tub 102, a control handle 106 is turned actuating a mechanical linkage 107 so as to open a damper 108 in the air duct 58. Hot air from the furnace then rushes into the hollow space 110 surrounding the inner wall 112 or water reservoir of the tub. This hollow space 110 may be defined in part by an adjacent wall of the room or in the case of a free standing tub, as illustrated, may be defined primarily by the inner and outer walls 112 and 114, respectively, of the tub itself. The hot air is discharged from the hollow space 110 through an air aspirating register 116. Because this register 116 is manually controlled by the handle 106, there is no thermostat control for it. During the summer, the user usually leaves the control 106 closed.

While taking a bath, the user can conveniently open the control 106, and the flow of hot air through the hollow space 110 maintains the bathwater at a desirable warmth for long periods of time without adding further hot water. In a bathroom which has an air temperature of 70° F., tests have shown that this high temperature, high pressure air flow in the hollow about the water reservoir 112 will maintain the bathwater at a desirable warmth for as long as an hour.

Moreover, there is an advantageous functional cooperation provided by this system which assures that hot air is always available whenever a bath is being taken. When the user opens the hot water valve 118 to begin drawing water into the tub, then cold water enters the storage tank 20 to replace the hot water being withdrawn. The flow of this cold water from the tank 20 down into the header 17 actuates a water thermostat 119 as will be explained further in connection with FIGURE 6, and this thermostat turns on the furnace. The thermostatic elements 68 prevent more than the proper amount of warm air from going into the various rooms of the house, but the hot air is available to flow through the open duct 58 as desired by the user.

The water thermostat 119 is mounted near the base of the hot water heater unit 12, and a capillary line 120 extends to a temperature sensing element which is inserted into a sleeve housing 121 formed by a short length of copper tubing soldered onto the header 17. Thus, there is good heat transfer provided from the header into the sleeve housing and thus to the temperature sensing element.

It is an advantage of this system that the hot water heater unit 12 is adapted to be conveniently installed in a furnace unit 10 at the factory during fabrication, or in the case of furnace units which are already installed in homes, the hot water heater 12 can be conveniently incorporated into the furnace. As seen in FIGURES 2 and 3, the hot water heater unit 12 is supported in place in the furnace by means of a pair of legs 122 and by a connection between the bonnet 42 and the water heater inlet duct 72. Consequently, the water heater unit 12 is installed in an existing furnace by removing a back panel of the furnace housing 15 which corresponds in size and shape with the front panel 123 (FIGURE 4). The unit 12 is installed so that the two legs 122 rest at the base of the housing 15, and the bonnet 42 and duct 72 are connected together. In this position the return duct 92 is directly opposite the intake 54 of the blower 48, and thus the air flow circuit through the water heater unit 12 is completed. A replacement back panel 124 is installed, as seen in FIGURE 4, and it only extends backwardly a small distance beyond the original rectangular outline of the furnace housing 15. Thus, in this example, the integral space heating and water heating unit is only slightly larger than the high velocity hot air space heater itself.

Figure 7:
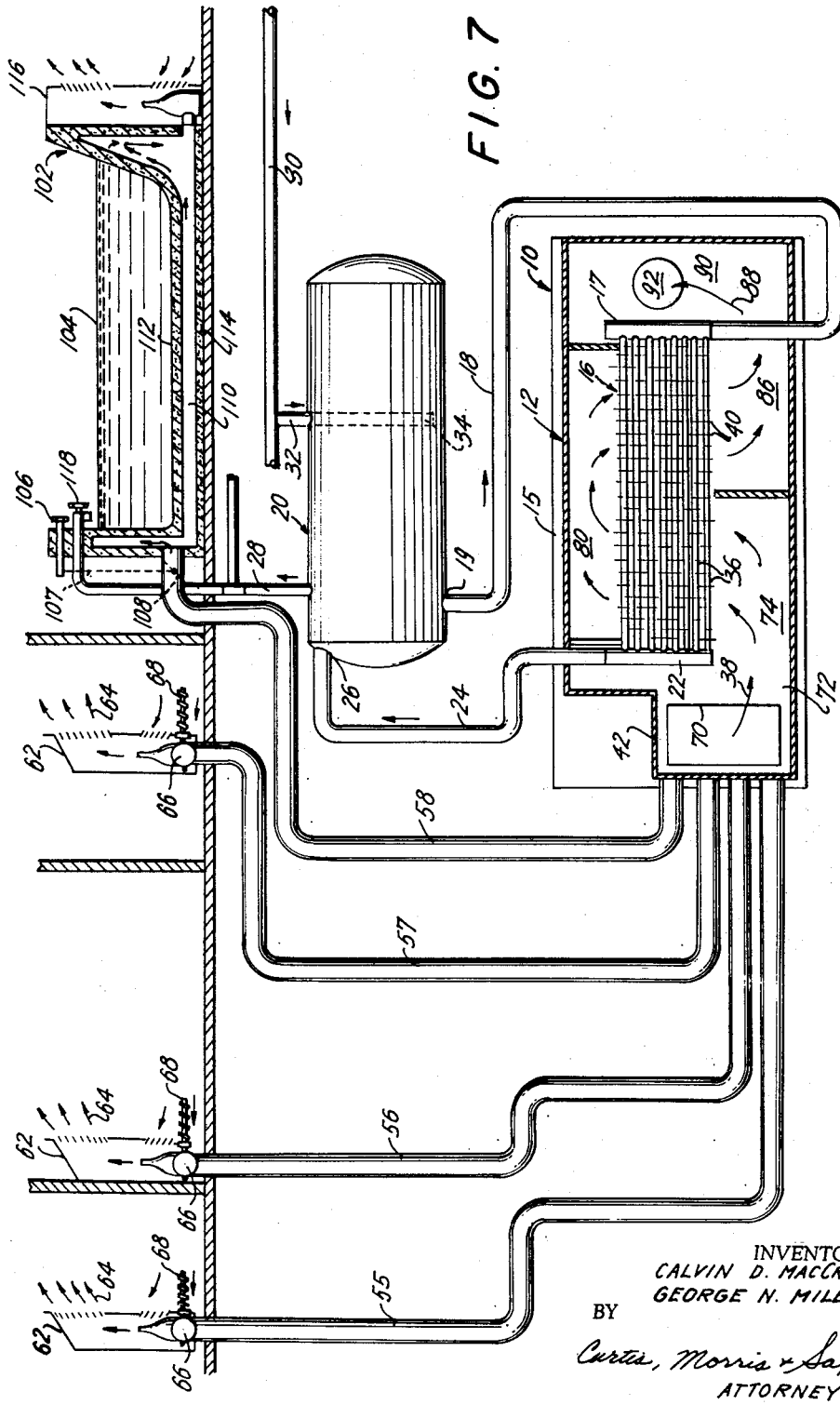
FIGURE 7 is an elevational view of another illustrative example of the invention wherein the integral hot air heater and hot water heater unit extend horizontally.

For convenience of illustration, FIGURES 1 and 7 do not show both of the short pipes 18 and 18', which are included and extend from the opposite ends of the cold water header 17 as explained above. The integral hot air space heater and hot water heater unit 10 is adapted to be installed in a horizontal position as shown in the system of FIGURE 7 wherein reference numbers corresponding with those used in FIGURE 1 indicate corresponding parts of the system. The unit 10 is installed with the cold water line 18 always connected to the short pipe at the bottom end of the header 17 as will be understood from FIGURE 7. The reason for connecting the cold water inlet pipe 18 to the lower end of the cold water header 17 when the furnace is horizontal as shown in FIGURE 7 is that this connection provides a substantially equal division of the flow by gravity through the tubes 36 into the outlet header 22, i.e., stratification is avoided.

In either the system of FIGURE 1 or FIGURE 7, during operation of the water heater 12, heated air 38 is introduced from the bonnet 42 into the water heater air intake 72 having a temperature of approximately 350° F. When the water in the heat exchanger 16 is at room temperature, then the air flow 88 back to the mouth of the blower is at a temperature of approximately 140° F. However, when the water in the heat exchanger 16 has reached its upper limit of approximately 160° F., then the return air flow 88 is at a temperature of approximately 175° F.

As shown in FIGURE 6, the electrical control circuit for the integral hot air space heating and water heating system as described above provides an advantageous and efficient cooperative interaction of components. The circuit connections and elements which are drawn to the left of the centerline 126 are those which are well known in the art and are commercially available for controlling a high temperature, high pressure air heater as shown in the Patent No. 2,752,912 mentioned above. To the right of this center line are the additional circuits and components which are incorporated for automatic operation of this integral hot air space heating and hot water heating system.

The electrical power is supplied from suitable power mains 130, for example, carrying 120 volt 60 cycle alternating current and is fed through a main shut off switch 132 and a 20-ampere fuse 134 to the lines 135 and 136. It will be understood that the fused line 135 is the so-called "hot" line, whereas the unfused line 136 is at zero potential with respect to the earth, i.e. it is the neutral return or "ground" line. An ignition transformer 137 having a secondary winding with its midpoint grounded provides 10,000 volts to spark plug leads 138 for ignition of the fuel. This transformer and a fuel flow control valve 139 are energized by a wire lead 140 connected to a protective relay circuit 141, which is described in detail further below. The fuel flow control valve 139 can be arranged to control the flow of gas or the flow of furnace fuel oil to the burner 44 as may be required in the various home installations.

It is the function of the protective relay circuit 141 to deenergize the ignition transformer and to shut off the flow of the fuel by deenergizing the valve 139 whenever the fuel has failed to ignite within a few moments after the furnace is turned on. Also, this protective relay circuit 141 serves to shut off these furnace components if the furnace should overheat for any reason. In order to accomplish these functions, the protective relay circuit 141 is connected through three leads 143 to a flame detector 144 which is responsive to the temperature of the combustion chamber near the burner 44 and is also responsive to the temperature of the combustion gases being discharged to the flue vent.

For purposes of turning on the hot air furnace 14 whenever space heating is required, a room thermostat switch 146 is connected through a pair of leads 147 and 148 to the protective relay circuit 141, and this thermostat 146 is positioned within a suitable one of the rooms or in a central hallway in the house. In most installations the thermostat switch 146 is located physically in the room which normally is heated until its air reaches the highest temperature by having its register thermostat element 68 set at the highest temperature because normally this room will require more extensive amounts of heat, and so it will be the first to demand heated air from the furnace. If desired, a second thermostat switch identical with the thermostat 146 can be connected in parallel therewith and located in another warm room in the house. Then, in such a dual-thermostat system, closure of either of these switches 146 will turn on the furnace.

The "hot" electrical line 135 is connected to a safety thermostat switch 150, which is responsive to the temperature of the bonnet 42. A similar safety thermostat switch 151 is included in the circuit for the blower motor 152. These safety thermostat switches will snap themselves open in case of overheating of the bonnet 42 or of the blower motor 152. From this safety switch 150, a lead 153 is connected to a blower control circuit 154, which is sometimes referred to as a fan and limit control. A suitable protective relay circuit 141 as shown can be obtained commercially, for example, from Minneapolis-Honeywell Regulator Company under the designation of Protectorelay.

The blower starts when the furnace starts; that is, the blower motor is energized when the room thermostat 146, or the water thermostat 119 demands service. It is the function of the blower control circuit 154 to assure that the blower remains operating to blow air through the hot air heat exchanger 46 at any time that the temperature of this heat exchanger exceeds a predetermined limit. Thus, even though the protective relay circuit 141 is operating to shut down the furnace, the blower control circuit 154 will maintain the blower 48 in operation for a short period of time. The resultant rapid flow of fresh air through the heat exchanger 46 quickly cools off the furnace, and then the blower motor 152 is shut off. One side of the motor 152 is connected by a wire 156 to the line 136, and the other side is connected through the thermostat 151 and a wire 158 to the blower control circuit 154. A wire 160 connects the blower control circuit 154 to the protective relay circuit 141 and serves as the "hot" supply lead for this circuit 141. Thus, all of the energizing current for the furnace is drawn through the bonnet safety switch 150, and when it is open, then all of the furnace circuits are deenergized.

In order to turn on the furnace whenever heating of the water is required, the aquastat 119 is made responsive to the temperature of the cold water header 17 as explained above. This water thermostat 119 is connected by a pair of leads 163 and 164 to the same terminals 165 and 166 as the connections 147 and 148 to the room thermostat. Whenever the temperature of the water in the header 17 is below the lower limit setting of the water thermostat 119, then a ganged pair of switch arms 167 and 168 are moved by the thermostat mechanism in the water thermostat 119 to their respective lower or "cold" positions, thus completing a circuit between the terminals 165 and 166 of the protective relay circuit 141. As a result, the furnace is turned on to heat the water. This circuit between terminals 165 and 166 for turning on the furnace can be traced as follows: through the lead 163 to a water thermostat switch contact 170, through the switch arm 167 (which is assumed to be in its "cold" position) to the other lead 164 and therethrough to the other terminal 166.

In this system the damper 94 is normally held in its open position. Thus, as soon as the air heater 14 begins operation, the hot air begins rapidly to heat up the water in the exchanger 16. While the water is being heated, a demand may arise for heating one or more of the rooms of the house, and as explained above, this system can be arranged so that there is always available a substantial quantity of hot air for space heating service. For example, in an installation utilizing a furnace capable of delivering 75,000 B.t.u., this system is adapted to have at least 40% of the hot air capacity of the furnace unit 10 always available for space heating, and in an installation utilizing a furnace of 100,000 B.t.u. capability at least 57% of the hot air capacity is always available for space heating service. After the hot water is fully heated, then 100% of the hot air capacity is immediately and automatically made available for space heating. In a modified system described further below, the full heat output is used alternatively for either service as required.

Advantageously, each of these systems delivers at least 42,000 B.t.u. for water heating service, providing a high recovery rate for hot water usage. The recovery rate is 50 gallons per hour, 100° F. temperature rise.

It is an advantage of a system embodying this invention that it enables the use of a water thermostat having a relatively large temperature differential between the demand and satisfied positions. When the temperature of the water in the cold water header 17 reaches the upper temperature limit to which the water thermostat 119 has been set, then the water thermostat is satisfied and its switch arms 167 and 168 move to the "hot" position. This opens the circuit between the terminals 165 and 166. If the room thermostat 146 is open when the water thermostat is satisfied, then the furnace is turned off.

If, however, the room thermostat 146 is closed, demanding further space heat when the water thermostat is satisfied, then the damper 94 is automatically moved to its closed position so as to prevent any hot air flow through the water heater 12. Consequently, all of the hot air is made available for space heating. The circuit for energizing the damper motor 96 to close the damper 94 can be traced from the secondary winding 172 of a stepdown transformer 174 through a lead 176 and a connection 178 to the motor 96. From the opposite side of this motor 96, the circuit continues through a connection 180 and through the water thermostat switch arm 168 (in the "hot" position) to the contact 170. As a result of the fact that the room thermostat 146 is closed, there is a connection directly between the leads 163 and 164 back to a contact 182 of a damper position actuated switch 184. Because the damper is in its open position, the motor energizing circuit is completed through the switch arm 184 back to the opposite side of the secondary 172.

This step-down transformer provides a suitable reduced safe voltage for use in the room thermostat 146 and its leads 147 and 148. For example, this transformer as illustrated may supply 24 volts. The motor 96 is a small alternating-current motor adapted for operation by this reduced A.C. voltage, for example, it is a shaded-pole motor. As soon as the damper 94 has been moved through an angle of 90° to its fully-closed position, then the switch arm 174 is moved over into engagement with a contact 186 which opens the motor energizing circuit and leaves the damper 94 closed.

Whenever the water thermostat is switched to its "cold" position by a drop in the water temperature below the lower limit setting, this system automatically opens the damper 94, and if the furnace is not already turned on, then it is turned on. The engagement of the water thermostat switch arm 167 with the contact 170 will turn on the furnace as explained above, if it is not already on. The engagement of the switch arm 168 with a contact 188 will energize the motor 96 so as to move the damper 94 through an angle of 90° from its closed to its open position. This damper-opening circuit is traced as follows: from the secondary 172 through the switch arm 184 (in its closed position) to the contact 186 and then through a lead 190 to the contact 188 and through the water thermostat switch arm 168 (in its "cold" position) and through the connection 180 to the motor 96. From the opposite side of the motor, the circuit is completed through the connection 178 and through the lead 176 back to the secondary 172.

Figure 9:
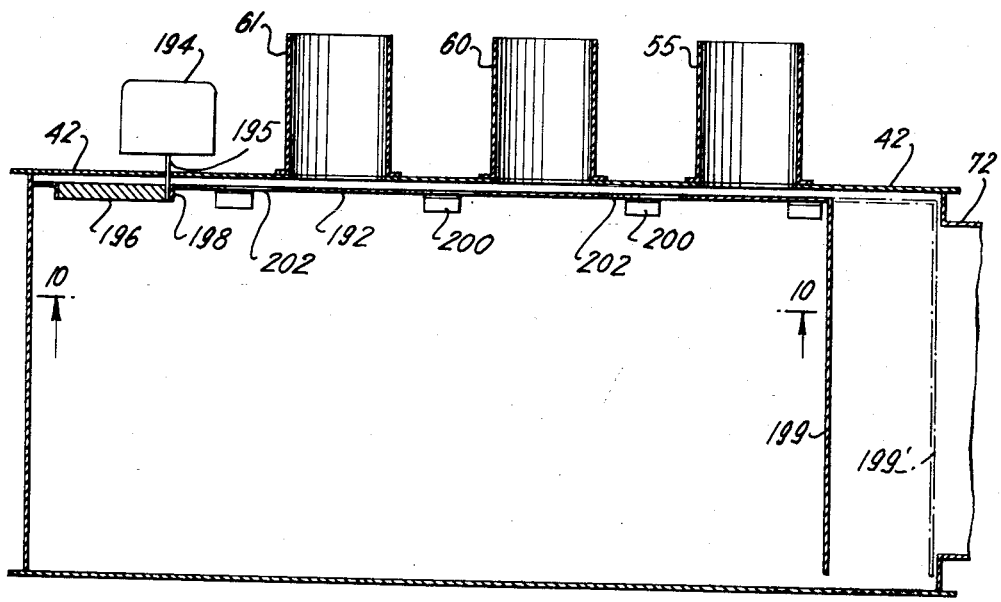
FIGURES 9 and 10 show a valve mechanism for alternatively supplying all of the hot air flow for space heating service or for water heating service.
Figure 10:
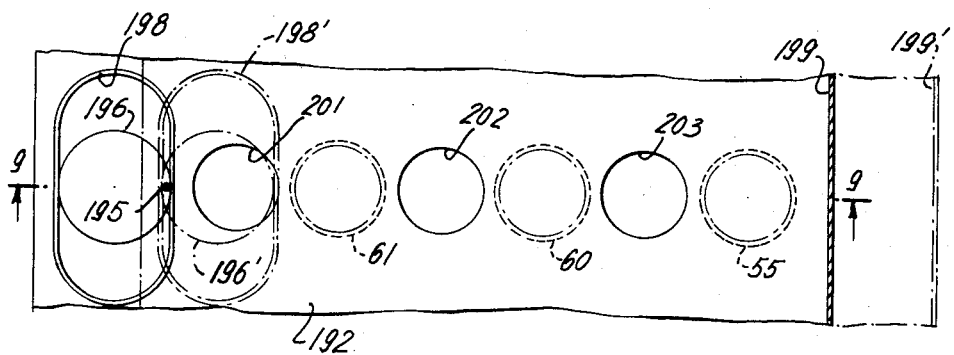

In certain home installations, it is found desirable to divert all of the hot air away from the space heating equipment into the hot water heater unit, as shown in the modified system of FIGURES 9 and 10, for providing an accelerated heating of the hot water so as to obtain a very rapid recovery or re-generation of hot water in the tank 20. This system of FIGURES 9 and 10 is similar to the systems shown in FIGURES 1–6 and 7 except that the motor 96 and damper 94 are replaced by a slidable damper 192 located in the bonnet 42. This damper 192 is moved by a motor 194 connected by a shaft 195 to an eccentric cam 196 which engages in an elongated cam follower sleeve 198 secured to the damper. The damper 192 is slidably supported by guide means in the form of brackets 200 and has two alternative operating positions in which it either blocks off all of the hot air flow to the hot water heater unit or blocks off the flow to the space heating ducts 55, 56, 57, 58, 60, 61, etc. The damper 192 has an L-shape with an end prtion 199 adapted for closing off the intake chamber 72 for the hot water heater and includes a plate operating as a shear valve with a plurality of openings 201, 202, 203, etc., which align with the ducts 55–58, 60, 61, etc., when they are to be open. When this shear valve moves to the left to the position shown in full lines in the drawings, then these openings 201, 202, 203, etc., are shifted away from alignment with these ducts, so as to block off the flow therethrough while opening up the water heater intake 72. When the end portion of the damper 199 is moved to the right to the position 199′ as indicated by the broken lines, then the water heater intake 72 is closed, and the space heating ducts are open.

Figure 8:
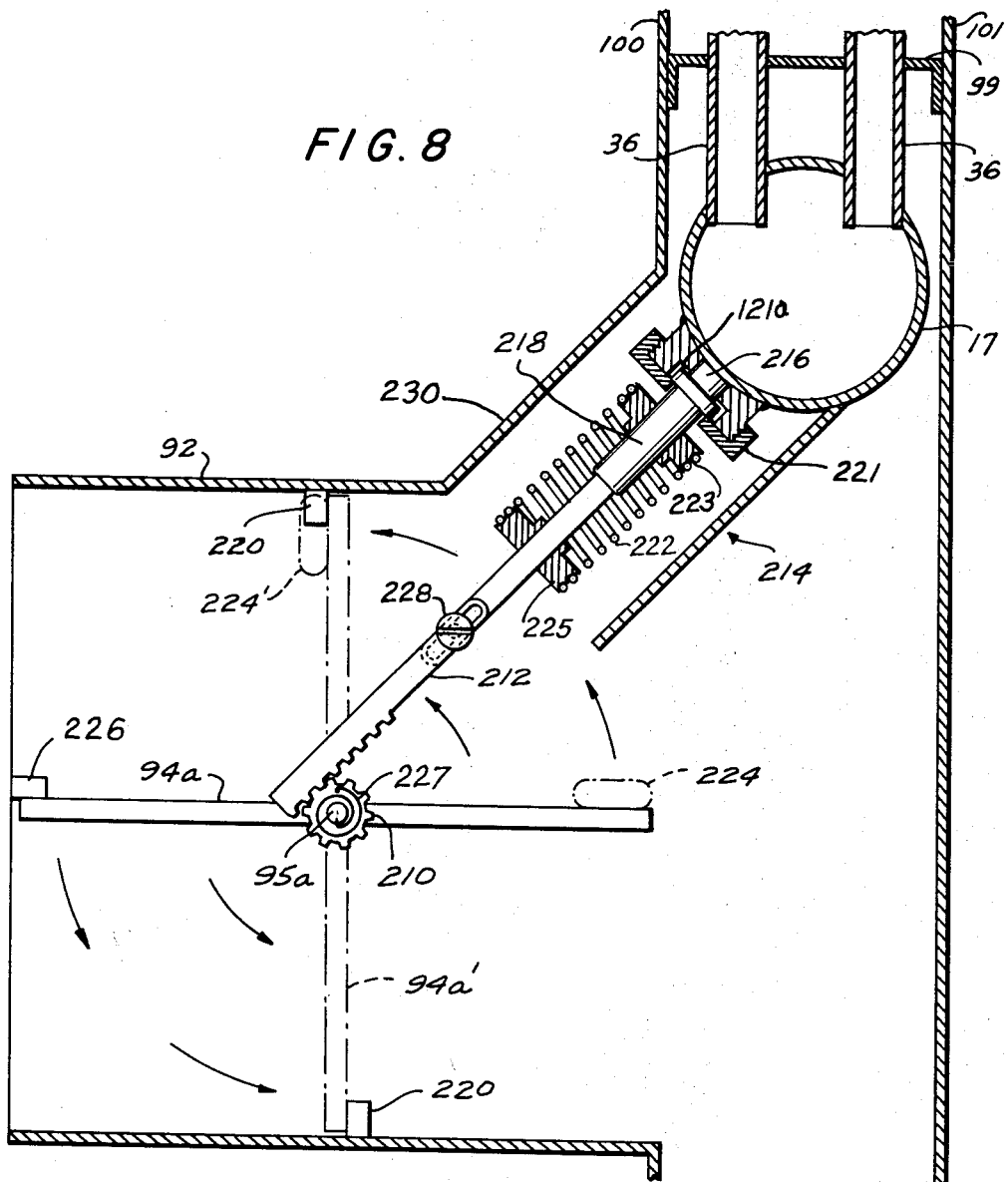

FIGURE 8 corresponds generally with the lower portion of FIGURE 2 shown on enlarged scale and illustrates a modified system with an automatic, thermostatically actuated damper 94a, instead of an electric motor driven damper. This damper 94a is similar to the damper 94 of FIGURE 2, except that damper 94a has a horizontal shaft 95a operated by a pinion 210 driven by a movable rack 212. In order to move the rack 212 in accordance with changes in temperature of the cold water header 17, a plunger-type thermostat unit 214 is utilized, including a temperature-sensing head 216 adjacent to the header 17, and which contains a heat-expansible wax-like medium. When the water in the header 17 has reached its upper temperature limit, which for example is described as 120° F., then the heat-expansible medium within the head 216 expands and pushes upon a piston contained in the cylindrical body 218 so as to extend the rack. This turns the damper 94a to its closed position in which it strikes against stops 220 in the duct 92. The thermostat unit 214 is positioned within a socket 121a formed by a short length of metal of good heat conductivity, such as copper, soldered perpendicularly onto the header 17. The head 216 of the thermostat is held in place by a clamping collar 221 which engages a shoulder on the thermostat unit 214.

When the temperature of the water in the header 17 has dropped down to the lower limit, then the heat-responsive medium in the thermostat head 216 is compacted by a return tension spring 222 which is anchored by a spring nut at 223. The other end of this spring is secured to a spring nut 225 which is connected to retract the rack 212. A suitable plunger-type thermostat unit 214 is available commercially as a "Vernatherm" element from the American Standard Controls Division of American Radiator and Standard Sanitary Corporation.

A tilt-responsive switch 224, such as one containing a small globule of mercury movable by gravity, is mounted upon the damper 94a. When this damper is in its open position as indicated in full lines in FIGURE 8, then this switch 224 is closed, and it completes a circuit between the leads 163 and 164, calling for water heating service to be supplied. As shown in FIGURE 8A, the thermostat unit 214 in cooperation with the switch 224 results in a greatly simplified electrical control network. All of the circuitry to the right of the dashed line 126 of FIGURE 6 is replaced by this switch 224 which is connected to the two leads 163 and 164. In its open position the damper 94a engages a stop 226. To accommodate any additional movement of the rack 212 at either end of its stroke, the pinion 210 is rotatably mounted on the shaft 95a, and a torsion spring 227 couples the pinion to this shaft. For setting the desired water temperature, an adjustment for the temperature limits at which the damper 95a is opened or closed and at which the switch 224 is actuated is provided by changing the effective length of the shank of the rack 212 by means of an adjusting screw 228 in a slot.

When the damper 94a is turned to its closed position 94a′ as indicated by the dashed lines, then the mercury globule moves away from the contacts within the switch 224 so that the switch 224 is opened indicating that the demand for water heating service has ceased. A tubular housing 230 surrounds the thermostat unit 214 to protect it and has an open end through which passes the shank of the rack 212.

In these illustrative examples of the invention, the addition of the hot water heater unit to a furnace as shown only requires an additional three inches of clearance space behind the furnace, for the rear cover panel 124 only extends three inches back from the furnace housing 15.

As examples of suitable commercially available thermostat controls which operate suitably in this system, the following are listed: blower control circuit 154 is obtainable commercially from Minneapolis-Honeywell Regulator Company, under the designation fan and limit control Model No. L498L and is arranged to be responsive to the temperature of the air in the bonnet 42 of the furnace. The protective relay circuit 141 is obtainable from this same company as Protectorelay Model R866, and the flame detector 144 from this company as Pyrostat Model C551. The water thermostat 119 is available from Robertshaw-Fulton Controls Company as Model F1A Thermostat.

As examples of suitable operating temperature ranges for this system, it is noted that the "cold" or demand temperature for the water thermostat 119 or 214 which senses the cold water header 17 may be set at a value in the range from 100° F. to 120° F., and the "hot" or satisfied temperature is set at a differential approximately twenty degrees above the cold setting. During operation the output header 22 is at a temperature above the input header 17 by a temperature difference in the range from 30° F. to 50° F. It will be understood that other temperature settings may be utilized in various installations; however, these values as given have proven quite desirable for typical home installations. The recovery rate is high, and as indicated above, these systems provide a 50-gallon per hour 100° F. temperature rise.

From the foregoing description it will be understood that the hot air space heating and hot water heating methods and apparatus of the present invention are well adapted to provide many advantages discussed above, and that they can be adapted to a wide variety of home installations and that various changes or modifications may be made therein, each as may be best suited to a particular installation, and that the scope of the present invention as defined by the following claims is intended to include such modifications or adaptations embodying the present invention.

What is claimed is:

1. A hot air space heating and domestic water heating system utilizing a common fuel burner source of heat, comprising a fuel burner source of high temperature, a blower for providing high velocity air to be heated at a pressure of at least 1.00 inch of water when operating for space heating, a chamber for receiving the heated air at an operating temperature in the range from 250° F. to 375° F., a plurality of diffusers for discharging the heated air in rooms to be heated, a plurality of distribution ducts leading from said chamber to said diffusers, each of said diffusers comprising means for inducing a flow of air through said diffuser in response to air flow from said ducts through said diffusers, means responsive to the ambient temperature adjacent each of said diffusers for regulating the flow of air through said ducts individually, room thermostat means connected to said fuel burner source for maintaining said fuel burner source in operation until the desired room temperature has been reached, a water heater comprising a water storage tank having a water inlet and a water outlet, a first connection near the bottom of said tank, a second connection near the top of said tank, insulation surrounding said tank, duct means connected to said chamber defining a path for recirculatory flow of heated air between said chamber and said blower, damper means for opening and closing said recirculatory path, means for opening and closing said damper means, a plurality of heat exchange tubes connected between said first and second connection; and exposed to the high velocity heated air in said recirculation path, and water thermostat control means responsive to the temperature of the water being heated for closing said damper means when the desired water temperature has been reached, said water thermostat control means including switch means connected in parallel with said room thermostat means for maintaining said fuel burner source in operation until the desired water temperature has been reached, whereby said room thermostat and water thermostat jointly control said fuel burner source and said damper means is closed when the desired water temperature has been reached for preventing overheating of the water.

2. An integral high velocity hot air space heating and hot water heating system comprising a blower having an intake open to the ambient air for delivering air at a pressure of at least 1.00 inch of water, a hot air heater connected to the out-put of said blower for heating the air delivered by said blower to a temperature in the range from 250° F. to 375° F., a plenum chamber connected to said heater, first duct means connected to said chamber for carrying the hot air to the rooms to be heated, room thermostat means connected to said hot air heater for controlling said heater in accordance with room temperature, second duct means connected to said chamber defining a high velocity hot air circulation path from said hot air heater to the intake side of said blower, said second duct means terminating near to but spaced from the intake to said blower, a hot water storage tank, a water heating coil including a plurality of tubes connected to said storage tank and positioned in heat exchange relationship with the high velocity hot air passing through said second duct means, damper means for shutting of the high velocity hot air flow through said second duct means, and water thermostat means responsive to the temperature of said coil for controlling said damper means, said water thermostat means being connected to said heater for controlling said heater jointly with said room thermostat for operating said heater whenever either of said thermostats is below its desired temperature level, whereby said heater is operated whenever either of said thermostats is below its desired temperature level and said damper means becomes closed whenever the room thermostat continues to call for heat but the water temperature reaches a desired level for preventing overheating of the water.

3. A high velocity air space heating and hot water heating system for the home utilizing a common source of heat comprising a hot air heating furnace including hot air output connection means and a fuel burner for heating air, a blower for moving air through the furnace and supplying said output connection means with hot air at a pressure of at least 1.00 inch of water and at a temperature in the range from 250° F. to 375° F., means defining a hot air circulation path extending from said connection means to the intake of said blower, a hot water heating coil in said hot air circulation path, a hot water storage tank, a first pipe line extending from the lower portion of said tank to the lower portion of said coil, a second pipe line extending from the upper portion of said coil to the upper portion of said tank, a cold water inlet line connected to said tank, a plurality of distribution ducts extending from said hot air output connection to the rooms to be heated, a bath tub having an enclosed hollow space adjacent thereto, a distribution duct extending from said output connection to said space, first damper means for regulating the flow of high velocity hot air through said latter duct, control means for said damper near said tub, a hot water supply line extending from said tank to said tub, hot-water valve means near said tub for controlling the flow of hot water through said latter line to said tub, second damper means for regulating the flow of high velocity hot air through said path past said coil, water thermostat means responsive to the temperature of the water in the lower portion of said coil for controlling said burner and said second damper means, whereby hot air is available for heating the tub and maintaining it warm whenever said hot-water valve means is opened to supply hot water into the tub.

4. An integral hot air space heating and hot water heating system utilizing a common source of heat for both the space heating and hot water heating services comprising a hot air heating furnace including a fuel burner for heating air, a hot air heater of elongated cylindrical configuration surrounding said burner, a blower at one end of said cylindrical air heater for moving the hot air at high velocity through the air heater and into an outlet hot-air supply chamber adapted to be connected to the rooms to be heated, said hot-air supply chamber being at the opposite end of said cylindrical air heater from said blower, a hot water heater including a plurality of water conducting tubes therein extending in spaced parallel relationship and parallel with said cylindrical air heater and defining heat exchange means having a greater width than thickness, said hot water heater including first and second duct means extending along opposite edges of said heat exchange means parallel to said tubes, said duct means having a greater thickness than said heat exchange means, said first and second duct means and said heat exchange means defining a wide U-shape as seen in a direction parallel with the axis of said air heater and being nested about one side of said air heater, said first duct means being connected to said supply chamber, said duct means defining a hot air circulation passage extending through said heater from said chamber to the intake of said blower for conducting the hot air at high velocity through said heat exchange means, said duct means conducting the high velocity hot air through said heat exchange means in a direction from edge-to-edge and perpendicular to said tubes.

5. A hot air space heating and domestic water heating system utilizing a common fuel burner source of heat both for space heating and for domestic water heating comprising said burner, a blower for providing air at a pressure of at least 1.00 inch of water to be heated, chamber means for receiving the hot air, a plurality of diffusers for discharging the heated air in rooms to be heated, a plurality of distribution ducts leading from said chamber means to said diffusers, each of said diffusers comprising means for inducing a flow of air through said diffuser in response to air flow from said ducts through said diffusers, means responsive to the ambient temperature adjacent each of said diffusers for regulating the flow of air through said ducts individually, a room thermostat, first circuit means connecting said room thermostat to said burner and blower for turning on said burner and blower when the room temperature is below a set value, a water heater comprising a water storage tank having a water inlet and a water outlet, insulation surrounding said tank, a first circulation line connected to the lower portion of said tank and a second circulation line connected to the upper portion of said tank hot air conducting means connected to said chamber means defining a path for recirculatory flow of hot air between said chamber means and said blower, damper means for opening and closing said recirculatory flow path, a water-heating coil connected between said first and second connection line, temperature sensing control means responsive to the temperature of the water in said tank, and second circuit means coupling said control means to said fuel burner and blower and to said damper means for turning on said burner and blower and for opening said damper means when the temperature of the water is below a set value and for closing said damper means when the water temperature reaches a desired level, for preventing overheating of said water.

6. A hot water heater attachment of wide U-shape comprising a cold water inlet header and a hot water outlet header in spaced parallel relationship, a plurality of water conducting tubes extending between said inlet and outlet headers in closely spaced parallel relationship, said headers and tubes defining a rectangular heat exchanger with said headers at opposite ends thereof, said rectangular heat exchanger having a width at least three times the thickness thereof, said hot water heater including first and second duct means extending along opposite edges of said heat exchanger parallel with said tubes, said duct means having a greater thickness than said heat exchanger and said duct means refining opposite sides of said U-shape with said heat exchanger defining the center of said U-shape, said first duct means being adapted to be connected to a high velocity hot air furnace, said first and second duct means defining a hot air circulation passage extending through said heat exchanger, said duct means conducting the high velocity hot air through a portion of said heat exchanger in a direction parallel with said headers and perpendicular to said tubes and back through another portion of said heat exchanger in the opposite directions.

7. A hot water heating attachment adapted to be connected to a high velocity hot air furnace of the type capable of delivering hot air at a pressure of at least 1.00 inch of water and at a temperature of at least 250° F. comprising a cold water inlet header, a hot water outlet header in spaced parallel relationship, a plurality of parallel tubes connected to and extending between nace and extending along one edge of said heat exchange means having a width at least three times the thickness, with said headers at opposite ends ends thereof, first duct means adapted to be connected to a furnace and extending along one edge of said heat exchange means parallel with said tubes, a plurality of fins extending around said tubes perpendicular thereto, and second duct means extending along the other edge of said heat exchanger parallel with said tubes for receiving the hot air passing therethrough, said first and second duct means and said heat exchanger defining a U-shaped structure as seen in a direction parallel with said tubes.

8. A hot water heating attachment as claimed in claim 7 including third duct means extending along the same edge of said heat exchanger as said first duct means, said duct means and fins defining an air passage extending transversely through one-half of said heat exchanger from said first to said second duct means and then transversely back through said heat exchanger from said second to said third duct means.

9. A hot water heating attachment as claimed in claim 7 and including electrically operated damper means for controlling the flow of hot air through said heat exchanger, thermostat means responsive to the temperature of said cold water inlet and connected to said damper means, said thermostat means being adapted to be connected electrically in parallel with a room thermostat for a furnace.

10. A hot air space heating and hot water heating system utilizing a common source of heat comprising a hot air heating furnace including a fuel burner and a blower for moving the hot air at high velocity to the rooms to be heated, a hot water heater having water conducting means and a hot air circulation passage for conducting hot air from the furnace into heat exchange relationship with said water conducting means, expansible thermostatic means for sensing the temperature of said water conducting means, damper means having an open and a closed position, operating means for said damper means for opening and closing said damper means, and a mechanical connection from said thermostatic means to said operating means for controlling the flow of hot air through said circulation passage in accordance with the temperature of said water conducting means.

11. A hot air space heating and hot water heating system as claimed in claim 10 including switch means actuated by said thermostatic means, a control circuit for said burner and blower, and circuit means connecting said switch means to said control circuit.

12. A damper arrangement for controlling the distribution of hot air from the plenum chamber of a high velocity hot air furnace having a plurality of space-heating outlets therefrom and also having a recirculation passage extending from said plenum chamber for heating water, said damper arrangement including slidable plate positioned in the plenum chamber with a barrier plate attached thereto, said slidable plate having a plurality of valve openings therein, and drive means for moving said slidable plate into either of two operating positions, in one of said positions said valve openings being aligned with said space-heating outlets while said barrier plate closes said air circulation passage, and in the other of said positions said slidable plate closing off said space-heating outlets while said barrier plate is withdrawn from said air circulation passage.

13. A high velocity home heating and hot water heating system comprising a fuel burner and air heater, a hot air bonnet connected to said air heater for receiving the hot air supplied by said heater, a blower connected to said heater for delivering hot air through said heater to said bonnet at a pressure of at least 1.00 inch of water when operating solely for home heating purposes, thermostat control means for maintaining the temperature of the hot air in said bonnet in the range from 250° F. to 375° F., a plurality of ducts extending from said bonnet to the rooms in the home to be heated, a hot water heater including recirculation duct means extending from said bonnet to the intake of said blower, recirculation damper means for controlling the flow of hot air through said recirculation duct means, damper-operating means for opening and closing said recirculation damper means, a hot water storage tank, a heat exchanger in said duct means and connected to said storage tank, a cold water inlet connected to said tank, a bath tub, a hot water faucet for said tub, a hot water line connected from said storage tank to said faucet, said tub having a hollow space surrounding it, a duct connected from said bonnet to said hollow space, a damper and manual control means for said damper for controlling the flow of hot air through said duct to said hollow space, room thermostat means associated with the rooms to be heated, first circuit means connecting said room thermostat means to said fuel burner for turning said fuel burner on whenever the temperature of the rooms is below a desired value, water-temperature responsive means for respondnig to the temperature of the water being heated, second circuit means connecting said water-temperature responsive means to said fuel burner for turning said fuel burner on whenever the temperature of the water is below a desired level, said water-temperature responsive means being connected to said damper-operating means for closing said recirculation damper means whenever the water temperature rises up to a predetermined level, thereby to control the fuel burner jointly by the room thermostat and the water-temperature responsive means, whereby the fuel burner is turned on as the bath tub is being filled with hot water for delivering hot air to said hollow space around the tub.

14. A high velocity hot air space heating and hot water heating system utilizing a common source of heat comprising a hot air heating furnace including a fuel burner and a blower for moving the hot air at a high velocity to the rooms to be heated at a temperature in the range from 250° F. to 375° F., a hot water heater having water conduction means and a hot air circulation passage for conducting hot air from the furnace into heat exchange relationship with said water conduction means, damper means for controlling the flow of hot air through said circulation passage, damper-operating means for opening and closing said damper means, first thermostatic switch means responsive to the temperature of said water conduction means for controlling said damper-operating means, second thermostatic switch means responsive to the temperature of the rooms being heated, and circuit means connecting both of said thermostatic switch means to said fuel burner and blower, whereby said fuel burner and blower are jointly controlled thereby.

15. A hot water heater comprising a heat exchanger having a pair of spaced parallel walls, a cold water manifold extending along the bottom of said exchanger, a hot water manifold extending along the top of said exchanger parallel with said cold water manifold, a plurality of parallel heat exchange tubes extending vertically between said pair of walls and interconnecting said manifolds, a plurality of parallel fins extending perpendicular to said tubes between said pair of walls, said fins being numerous and closely spaced and surrounding said tubes in heat exchange relationship therewith, duct means defining an inlet and a first vertical hot air passage extending parallel with said tubes and communicating with the space among said fins between said pair of walls along one edge of the heat exchanger and extending for approximately one-half of the length of said tubes, second duct means defining a second vertical hot air passage extending parallel with said tubes and communicating with the space among said fins between said pair of walls along the other edge of the heat exchanger, said second passage extending for substantially the entire length of said tubes, and third duct means defining an outlet and a third hot air passage extending along said one edge for the remainder of the length of said tubes beyond said first passage and communicating with the space among said fins between said pair of walls.

16. A heat exchanger attachment adapted to be attached to a hot air furnace of the type which supplies hot air at a temperature above 250° F., said heat exchanger attachment including spaced walls defining a casing having a greater width than thickness, a hot water manifold extending along one end of said exchanger and a cold water manifold extending along the other end of said exchanger, a plurality of water-conducting tubes extending between said manifolds and positioned between said walls, numerous parallel heat exchange fins extending between said walls and surrounding said tubes in heat-exchange relationship therewith, said walls defining an intake opening at one end of said casing and an outlet opening at the other end of said casing and a hot air circulation passage extending through said exchanger from the intake opening to the outlet opening, said circulation passage extending through a first portion of said exchanger in a direction from edge-to-edge parallel with said fins between said walls and extending back through another portion of said heat exchanger in the opposite direction from edge-to-edge parallel with said fins and between said walls, said circulation passage terminating in the outlet opening at the other end of the exchanger from the inlet opening.

17. A heat exchanger attachment adapted to be attached to a hot air furnace of the type which supplies hot air at a temperature above 250° F., said heat exchanger attachment including spaced walls defining a casing having a greater width than thickness, a hot-water manifold and a cold-water manifold, a plurality of water-conducting tubes extending in parallel flow arrangement between said manifolds and positioned between said walls, numerous parallel heat exchange fins extending between said walls and surrounding said tubes in heat-exchange relationship therewith, said walls defining an intake opening at one end of said casing adapted to be connected to the bonnet of the furnace and an outlet opening at the other end of said casing, and a hot air circulation passage extending through said exchanger from the intake opening to the outlet opening between said walls and parallel to said fins, said circulation passage terminating in the outlet opening at the other end of the exchanger from the inlet opening, support means at the end of said exchanger near the outlet opening for supporting the exchanger from the floor, whereby said exchanger can be attached to the bonnet and supported from the floor in position along one side of a hot air furnace.

18. A combined hot air furnace and hot water heater comprising a blower at the bottom of the furnace having an intake, an elongated cylindrical air heater extending upwardly from said blower, a fuel burner for heating the air in said air heater, a bonnet chamber at the top of the furnace for receiving the hot air, a heat exchanger extending vertically along one side of the furnace comprising inner and outer walls defining a casing having a greater width than thickness, a hot-water manifold and a cold-water manifold, a plurality of water-conducting tubes extending between said manifolds and positioned between said walls, said tubes being connected in parallel flow arrangement between said manifold for providing a plurality of flow passages from the cold water manifold to the hot water manifold, numerous parallel heat exchange fins extending between said walls and surrounding said tubes in heat-exchange relationship therewith, said walls defining an intake opening at the top end of said casing and outlet opening at the bottom end of said casing, said inlet opening being connected to the bonnet chamber, and a hot air circulation passage extending through said exchanger from the intake opening to the outlet opening, said circulation passage extending through said exchanger in a direction parallel with said fins between said walls, said circulation passage terminating in the outlet openings at the bottom end of the exchanger adjacent to the intake of the blower.

References Cited by the Examiner

UNITED STATES PATENTS

| | | | |
|---|---|---|---|
| 513,842 | 1/94 | Treiber | 237—19 X |
| 1,894,987 | 1/33 | Fusco | 165—172 |
| 1,897,413 | 2/33 | Anderson | 165—75 |
| 2,008,255 | 7/35 | Larkin | 165—124 |
| 2,212,222 | 8/40 | Austin | 237—19 |
| 2,291,023 | 7/42 | Burklin | 236—20 X |
| 2,381,215 | 8/45 | Hahn | 236—33 |
| 2,434,267 | 1/48 | Gorman | 126—101 X |
| 2,470,488 | 5/49 | Honerkamp et al. | 98—40 |
| 2,579,507 | 12/51 | MacCracken | 126—110 X |
| 2,699,106 | 1/55 | Hoyer | 98—41 |
| 2,833,268 | 5/58 | Warren | 126—101 |
| 2,844,825 | 7/58 | Gauerke | 98—40 X |
| 2,990,161 | 6/61 | Blaskowski | 165—104 |

EDWARD J. MICHAEL, *Primary Examiner.*

FREDERICK L. MATTESON, Jr., PERCY L. PATRICK, *Examiners.*